(12) United States Patent
Visser et al.

(10) Patent No.: US 8,531,109 B2
(45) Date of Patent: Sep. 10, 2013

(54) LED TUBE SYSTEM

(75) Inventors: Jurjen Hilwert Visser, Helmond (NL); Guang Zhi Yu, Yunfu (CN); Shuang He Zeng, Jinggang Shan (CN); Michael Friedrich Albert Staudt, Geldrop (NL); Shu Kei Shea, Hong Kong (CN); Carl Rudolf Eduard Staudt, Asten (NL)

(73) Assignee: Ledned Holding B.V., Helmond (NL)

( * ) Notice: Subject to any disclaimer, the term of this patent is extended or adjusted under 35 U.S.C. 154(b) by 126 days.

(21) Appl. No.: 13/140,156

(22) PCT Filed: Dec. 16, 2009

(86) PCT No.: PCT/EP2009/067258
§ 371 (c)(1),
(2), (4) Date: Nov. 7, 2011

(87) PCT Pub. No.: WO2010/069983
PCT Pub. Date: Jun. 24, 2010

(65) Prior Publication Data
US 2012/0043892 A1 Feb. 23, 2012

(30) Foreign Application Priority Data

Dec. 16, 2008 (EP) .................................... 08171848

(51) Int. Cl.
*H05B 37/02* (2006.01)
*F21V 1/00* (2006.01)
(52) U.S. Cl.
USPC ............... 315/88; 315/294; 315/51; 362/221; 362/225; 362/240; 362/249
(58) Field of Classification Search
USPC ................. 315/51, 74, 77, 88, 291, 294, 312; 362/218, 221, 225, 217, 234, 240, 249, 252, 362/276, 394, 555, 652, 800, 802
See application file for complete search history.

(56) References Cited

U.S. PATENT DOCUMENTS

| 6,762,562 B2 * | 7/2004 | Leong .............................. 315/51 |
| 7,053,557 B2 * | 5/2006 | Cross et al. ...................... 315/74 |

(Continued)

FOREIGN PATENT DOCUMENTS

JP 11-135274 5/1999

OTHER PUBLICATIONS

International Search Report for PCT/EP2009/067258, mailed Mar. 5, 2010.

(Continued)

*Primary Examiner* — Vibol Tan
(74) *Attorney, Agent, or Firm* — Nixon & Vanderhye P.C.

(57) ABSTRACT

The invention relates to an LED tube system for driving at least one LED assembly comprising: an LED tube housing for containing the at least one LED assembly, two pairs of mains input terminals (A, B) provided at ends of the LED tube housing for receiving a mains supply voltage ($V_{mns}$) and for supplying the mains supply voltage ($V_{mns}$) to an internal part of the LED tube system for driving the at least one LED assembly, and further comprising a switching circuit being electrically connected with all mains input terminals (A, B, C, D) and being arranged for electrically connecting the pairs of mains input terminals together in a first state (2/ON) and electrically separating the pairs in a second state (1/OFF) of the switching circuit. The switching circuit being further arranged for providing a coupling capacitor (C10, C11) between the first pair and the second pair of input terminals in the first state (2/ON) and removing the coupling capacitor (C10, C11) in the second state (1/OFF) of the switching circuit. Due to the switching circuit the LED tube system in accordance with the invention can be used in lighting fixtures for parallel fluorescent tubes as well as in lighting fixtures for serial fluorescent tubes. The invention further relates to safety devices for the LED tube system.

15 Claims, 15 Drawing Sheets

(56) References Cited

U.S. PATENT DOCUMENTS

| | | | |
|---|---|---|---|
| 7,488,086 B2 * | 2/2009 | Wu et al. | 362/225 |
| 7,507,001 B2 * | 3/2009 | Kit | 362/276 |
| 8,147,091 B2 * | 4/2012 | Hsia et al. | 362/221 |
| 8,319,433 B2 * | 11/2012 | Lin et al. | 315/77 |
| 8,322,878 B2 * | 12/2012 | Hsia et al. | 362/221 |
| 2008/0197786 A1 | 8/2008 | Schaible et al. | |
| 2008/0253122 A1 | 10/2008 | Hancock et al. | |
| 2009/0091929 A1 * | 4/2009 | Faubion | 362/234 |
| 2010/0289428 A1 * | 11/2010 | Frazier et al. | 315/294 |
| 2011/0019433 A1 * | 1/2011 | Dussault | 362/555 |
| 2011/0149564 A1 * | 6/2011 | Hsia et al. | 362/221 |
| 2012/0043909 A1 * | 2/2012 | Bloom et al. | 315/294 |

OTHER PUBLICATIONS

Written Opinion of the International Searching Authority for PCT/EP2009/067258, mailed Mar. 5, 2010.

\* cited by examiner

LED TUBE SYSTEM

This application is the U.S. national phase of International Application No. PCT/EP2009/067258 filed 16 Dec. 2009, which designated the U.S. and claims priority to EP Application No. 08171848.8 filed 16 Dec. 2008, the entire contents of each of which are hereby incorporated by reference.

FIELD OF THE INVENTION

The invention relates to a LED tube system for driving at least one LED assembly. The invention further relates to safety devices for such LED tube system.

BACKGROUND OF THE INVENTION

Most lighting products in both the professional and private market consist of fluorescent lamps. Mostly, these fluorescent lamps are fluorescent tubes. A fluorescent lamp utilizes a fluorescent substance which converts ultraviolet radiation in the lamp into visible light. The efficiency of the fluorescent lamps is higher than that of the incandescent lamps, i.e. 90 Lumen/Watt versus 12 Lumen/Watt. Despite all this, since the introduction of the LED lamps, the fluorescent lamps are no longer the most energy efficient lighting technique. Moreover, the operational lifetime of the fluorescent lamps is relatively short, i.e. about 5000 operation hours, which implies regular replacement.

Every year 12.5 million fluorescent lamps are released on the Dutch market. In practice, replacement schemes for fluorescent lamps are such that they are replaced on a fixed moments in time before their technical life span is over. This happens, amongst other places, in companies and hospitals.

In fluorescent tubes the fluorescent coating (mostly phosphor) is provided on the inside of a glass tube, which is filled with an inert gas, such as Argon, Krypton, or a mixture of both, and mercury vapor (which is very poisonous). The mercury vapor emits ultraviolet light in case of a gas-discharge (which is initiated by putting a voltage over electrodes on two opposing end of the tube). The ultraviolet light is subsequently converted into visible light by the fluorescent coating on the inside of the tube.

It is not possible to connect a fluorescent tube directly to the lighting mains. This requires a starter and a choke (VSA), which are to be included in the armature. More recent fluorescent tubes are driven by an electronic choke (which uses very high switching frequencies). In any case such choke is also to be included in the armature.

LED technology, a form of sold-state lighting (SSL), is developing fast, especially in the application areas of signal lighting (traffic lights, monitoring lights, etc) and for small scale compact light sources (for example reading lamps, flash lights, or decoration lights). The development of LED towards full-fledged light source has not yet been possible due to technological barriers, such as the incompatibility with existing lighting installations/armatures.

Market leaders on the light market focus on the development of LED lighting in new systems, while focusing on traditional lighting technology (incandescent lamps, fluorescent lamps, low-energy bulbs) in the aftermarket. They do not seem to realize that LED lighting can be a sustainable alternative for existing light sources in this market as well.

When switching from fluorescent lighting technology towards another technology (such as LED technology) compatibility plays a major role. There is a major reluctance to step over to a new lighting technology due to large investments which have been done in armatures and installations, despite possible economic and ecologic advantages. Expressed differently, market acceptance for a new lighting technology is only quickly obtained on a short term where the lighting technology is fully replaceable with the existing lighting technology. Even the looks of the new lighting products must resemble the old ones. Thus there is a need for an environment-friendly lighting technology which can be replaced one-on-one with the current fluorescent tube systems.

The current compatibility problems with the retrofit-range are caused by the following aspects:
  there is limited physical space for components, i.e. new lighting products need to be implemented in existing systems and therefore need to have the same dimensions as the current lighting products;
  the shape of the new products must resemble the shape of the old products. For the end-user the shape of the new product must be recognizable before he is willing to accept the new product. This aspect puts severe design constraints in LED lighting products.

Because of the above-mentioned additional requirements to retrofit-systems, one of the most important aspects of an LED lamp which is at stake is the cooling of the LED's. LED's produce a significant amount of heat. Cooling systems are required for keeping the temperature of the LED's within acceptable limits. Active cooling systems, which have been reported in the prior art, are not desired in lighting applications because of several disadvantages which it has as well (more components which may get broken, i.e. reduced operational lifetime, noise, not enough space, etc).

Different so-called retrofit LED tubes have been disclosed in the prior art. Most of the known LED tubes comprise a plurality of low-power LED's connected in series, i.e. several hundreds of LED's. These LED tube can be mounted into a conventional lighting fixture having fluorescent tubes connected in parallel (using the full mains voltage).

A problem with the known LED tube is that they are not fully retrofit. The known LED tube is not suitable for being used in lighting fixtures having a plurality of LED tubes in series, and in particular two LED tubes.

SUMMARY OF THE INVENTION

It is an object of the invention to provide an LED tube system which is suitable for being used in lighting fixtures with a plurality of LED tubes in series.

The invention is defined by the independent claims. The dependent claims define advantageous embodiments.

In a first aspect, the invention relates to an LED tube system for driving at least one LED assembly, the LED tube system comprising:
  an LED tube housing for containing the at least one LED assembly;
  a first pair of mains input terminals provided at a first end of the LED tube housing and a second pair of mains input terminals provided at a second, opposing, end of the LED tube housing for receiving a mains supply voltage between a respective one of the first pair of mains input terminals and a respective one of the second pair of mains input terminals and for supplying the mains supply voltage to an internal part of the LED tube system for driving the at least one LED assembly, and
  a switching circuit being electrically connected with all mains input terminals and being arranged for:
  i) electrically connecting the first pair of mains input terminals in a first state of the switching circuit and electrically separating the first pair of mains input terminals in a second state of the switching circuit;

ii) electrically connecting the second pair of mains input terminals in the first state of the switching circuit and electrically separating the second pair of mains input terminals in the second state of the switching circuit;

iii) electrically connecting a coupling capacitor between a respective one of the first pair of mains input terminals and a respective one of the second pair of mains input terminals in the first state of the switching circuit and electrically separating the respective one of the first pair of mains input terminals and the respective one of the second pair of mains input terminals in the second state of the switching circuit.

The effect of the features of the LED tube system in accordance with the invention will be explained hereinafter. In the second state the switching circuit has disconnected all mains input terminals such that the mains supply voltage can normally be supplied to the internal part of the LED tube system for driving the at least one LED. In the first state, however, the first pair of mains input terminals effectively becomes one mains input terminal and the second pair of mains input terminals effectively becomes one mains input terminal. Also, in the first state the switching circuit connects a coupling capacitor between these joined input terminals. In a typical parallel-compensated double fluorescent tube lighting fixture there is the ballast in series with the two tubes. It is the coupling capacitor which features the series connection of two or more LED tubes in this fixture, because it closes the AC mains loop right at the mains input terminals, but also the coupling capacitor ensures that the input impedance of both tubes is matched such that both LED tubes get the same operation voltage. From the above it is apparent that the inventors have provided an LED tube system which is fully retrofit. Thanks to the switching circuit the LED tube system can be used in parallel as well as serial arrangements. Serially connected fluorescent tube systems are quite common and retrofit LED tubes are very advantageous as well.

In an embodiment of the LED tube system in accordance with the invention the switching circuit comprises:

i) a first switching element between the first respective one of the first pair of mains input terminals and the second respective one of the first pair of mains input terminals;

ii) a second switching element between the first respective one of the second pair of mains input terminals and the second respective one of the second pair of mains input terminals, and iii) a series connection of a third switching element and a coupling capacitor arranged between the respective one of the first pair of mains input terminals and the respective one of the second pair of mains input terminals, wherein the switching elements are all closed in the first state of the switching circuit and all opened in the second state of the switching circuit. The electrical circuit of this embodiment provides a convenient implementation of the earlier described function of the switching circuit.

In an embodiment of the LED tube system in accordance with the invention the switching circuit comprises switch housing with a plurality of mechanical switches provided therein for forming the first switching element, the second switching element, and the third switching element. Mechanical switches are advantageous in LED tube systems because of their simplicity, robustness, and reliability.

In an embodiment of the LED tube system in accordance with the invention the switch housing is located within the LED tube housing. Given a certain predefined LED tube length (forced by standards in the market), when the switching circuit is provided within the LED tube housing, there is more length available for the LED's (LED's may be placed along the complete length of the LED tube housing in that case).

An embodiment of the LED tube system in accordance with the invention comprises a further switch housing and a switch axle which is rotatably mounted within the further switch housing, and the plurality of mechanical switches are implemented in the further switch housing and the switch axle such that the plurality of mechanical switches are switched between the respective states by rotation of the switch axle within the further switch housing which respectively, wherein the rotation opens and closes a conduction path through the further switch housing and the switch axle. This embodiment of LED tube system is advantageous, because the switching circuit in accordance with this embodiment fits within a (elongate/tube-shaped) LED tube housing the best.

In an embodiment of the LED tube system in accordance with the invention each respective one of the plurality of mechanical switches comprises a respective conduction path, wherein each respective conduction path comprises: two respective switch connectors, and a respective electrically conductive connector ball with a respective electrically conductive spring between said switch connectors, wherein the switch axle comprises respective holes in which there is provided a respective one of the two respective switch connectors, the respective connector ball and the respective spring between the respective connector ball and the respective one of the respective two switch connectors, wherein another respective one of the two respective switch input connectors is provided adjacent to the switch axle such that in a first orientation of the switch axle corresponding with the first state the respective connector ball is pressed by the respective spring against the another respective one of the two respective switch input connectors and in a second orientation of the switch axle corresponding with the second state the respective connector ball is pressed against the further switch housing. The design of the switching circuit in this embodiment complies better with the safety requirements for electronic lighting products.

An embodiment of the LED tube system in accordance with the invention further comprises a rectifier circuit having a rectifier input for receiving the AC mains voltage from the mains terminals, and a rectifier output for supplying a rectified voltage, the rectifier circuit being arranged for rectifying the AC mains voltage to obtain the rectified voltage. Such rectifier circuit features the use of low-voltage high-power LED's.

In an embodiment of the LED tube system in accordance with the invention a driver circuit having a driver input for receiving the rectified voltage from the rectifier circuit, and a driver output being connected to the at least one LED assembly for supplying a DC output to the at least one LED assembly, the driver circuit being arranged for converting the rectified voltage into the DC output. Preferably, the driver circuit comprises a transformer for isolating a high-voltage part (the mains input part and the switching circuit) of the LED tube system from a low-voltage part (the LED driving part).

In an embodiment of the LED tube system in accordance with the invention a fuse circuit between the mains input terminals and the switching circuit for maximizing input currents of the mains input terminals. This embodiment provides for a higher safety of the product. It reduces the risk of fire.

In an embodiment of the LED tube system in accordance with the invention the LED tube housing is tube-shaped. Such tube-shaped housing makes the LED tube system look more similar to the conventional fluorescent tubes in the market (more retrofit).

In an embodiment of the LED tube system in accordance with the invention the LED tube housing has a length between 20 cm and 240 cm.

In an embodiment of the LED tube system in accordance with the invention the LED tube housing comprises materials selected from a group comprising: aluminum, brass, bronze, duralumin, copper, gold-plated metals, and silver-plated metals. These materials for the housing are relatively cheap, can be easily manufactured, and provide for a proper heat sink function of the housing.

In an embodiment of the LED tube system in accordance with the invention the plurality of LED assemblies thermally coupled to the LED tube housing and being equally spaced apart over a distance between 5 cm and 20 cm. This range of spacing is optimal. A smaller spacing will cause the LED assemblies to produce too much heat. A larger spacing will cause the LED tube system to produce too much shadow effects.

In an embodiment of the LED tube system in accordance with the invention the LED assembly comprises one LED. In another embodiment of the LED tube system in accordance with the invention the LED assembly comprises a plurality of LED's. In any case the LED tube system in accordance with the invention may use any type of high-power LED assembly that is available in the market.

In an embodiment of the LED tube system in accordance with the invention at a respective end of the LED tube housing the respective pair of mains input terminals is covered with a cover, wherein the cover comprises two terminal holes corresponding with locations of the mains terminals, wherein the cover can be pushed back and forth along the end of the LED tube housing, wherein the LED tube system is further arranged such that, before mounting, the cover is spaced apart from the end the LED tube system by means of springs to prevent direct contact with the terminals, and such that, during mounting, the cover is pushed inward for releasing the mains terminals. This embodiment of the LED tube system has a first variant of a safety device in accordance with the invention. It protects the user against electric shock when mounting the LED tube system in a lighting fixture.

In an embodiment of the LED tube system in accordance with the invention at a respective end of the LED tube housing an interruption switch is provided in a current path from the mains input terminals to the remaining part of the LED tube system, and which is controlled by an interruption button, wherein the interruption button is placed such that it is pushed inward when the LED tube system is placed in a lighting fixture for closing the interruption switch for establishing the current path. This embodiment of the LED tube system has a second variant of a safety device in accordance with the invention. It protects the user against electric shock when mounting the LED tube system in a lighting fixture.

These and other aspects of the invention are apparent from and will be elucidated with reference to the embodiments described hereinafter.

BRIEF DESCRIPTION OF THE DRAWINGS

In the drawings:

FIG. 5b shows a zoomed view of a few components in FIG. 5a;

FIG. 6b shows a cross-sectional view of the LED tube housing of FIG. 6a;

FIG. 7c shows a zoomed view of FIG. 7a;

LIST OF REFERENCE NUMERALS

Figure 1:
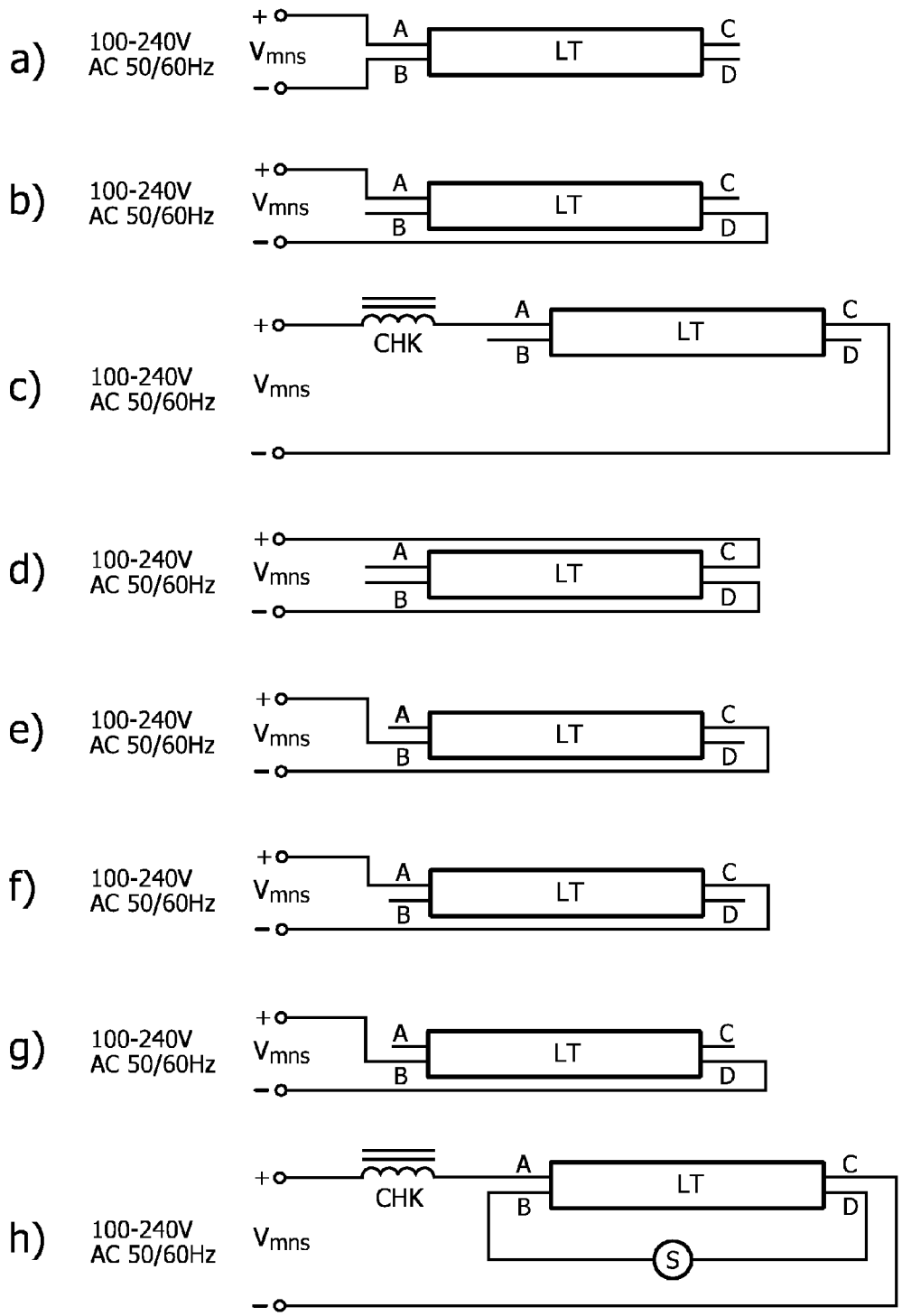
FIG. 1 shows eight different mains connection schemes of a system with a single tube.

LT LED tube
LT1 LED tube on the left
LT2 LED tube on the right
CHK choke/ballast
$V_{mns}$ AC mains voltage
A first mains input terminal (left pair)
B second mains input terminal (left pair)
C third mains input terminal (right pair)
D fourth mains input terminal (right pair)
F1 first fuse
F2 second fuse
F3 third fuse
S1 first switch (between terminals C and D)
S2 second switch (between terminals A and B)
S3 third switch (between terminals B and D)
S4 fourth switch (between terminals B and D)
C10 first coupling capacitor
C11 second coupling capacitor
C12 third coupling capacitor
U1 first diode bridge
U2 second diode bridge
$V_{rec}$ rectified voltage
1 LED tube housing
2 further switch housing
3 switch axle
4 switch insulating cover 5 connector ball
6 switch input connectors
7 switch output connectors
8 pin fixer
8' further pin fixer
9 mains input pins
10 switch housing
11 end cap (switch side)
12 end cap fixer (other side)
13 end cap (other side)
14 LED assemblies
15 reflector
16 transparent front cover
18 PCB
19 springs
20 PCB housing
21 rubber wiring protector
22 set pin
25 opening (in housing 1)
26 screw holes (in housing 1)
28 further screw holes
30 cooling fins
35 receiving slits
38 inner space (of housing 1)
40 cover
42 terminal holes
44 guiding slit
45 guiding ridge
48 spacer springs
50 interruption button
55 interruption switch
90 fuse circuit
100 switching circuit
110 rectifier circuit
120 spike-current-reduction circuit
130 filter
140 power factor correction circuit
150 first driver circuit
155 first peak-voltage-absorption circuit
160 second driver circuit
165 second peak-voltage-absorption circuit
170 third driver circuit
180 fourth driver circuit
200 first series connection of LED's
210 second series connection of LED's
TF1 transformer in first driver circuit
TF2 transformer in second driver circuit
L3 EMI-reducing coil
U3 controller IC in first driver circuit
U4 opto-isolator in first driver circuit
U5 controller IC in second driver circuit
U6 opto-isolator in second driver circuit

DETAILED DESCRIPTION OF THE PREFERRED EMBODIMENT

The invention aims at providing an LED tube system which can be applied in conventional lighting fixtures without requiring any modification to it, i.e. a retrofit tube system. More particularly, the invention further aims at providing an LED tube system which can be applied in lighting fixtures for multiple, for example two, fluorescent tubes connected in series (also called a parallel compensated lighting fixture) as well as lighting fixtures for multiple tubes in parallel. To achieve that object the LED tube system is provided with a switching circuit, which is further explained in the figures and the corresponding parts of the description. The invention further aims at providing a safety device for protecting a user against electric shocks.

In order to facilitate the discussion of the detailed embodiments a few expressions are defined hereinafter.

Throughout this description the term "LED assembly" should be interpreted as an assembly comprising at least one LED which is arranged for emitting light into a light-emitting direction. Such LED may be provided on a carrier substrate, such as a PCB, which may have a heat-sink function as well. The LED may be provided with optics to further improve the light beam coming out of the assembly. The LED assembly may further comprise electrical terminals for connecting at least one LED to a power supply. These days there are many different LED assembly suppliers. For the invention it is not very relevant which LED assembly is taken as long as other parts of the LED tube system are adapted such that the LED assembly can be mounted thereon.

FIG. 1 shows eight different mains connection schemes of a system with a single tube. The LED tube system in accordance with the invention is designed such that it is fully compatible with the starter and the ballast/choke of conventional lighting fixtures. This compatibility is realized, amongst others, by implementing an electronic circuit, which is further discussed later in the description. FIG. 1 illustrates what is meant with full compatibility with single tube systems. A conventional fluorescent tube has four electrical terminals A, B, C, D, i.e. one pair on each end. In normal operation the conventional fluorescent tube receives a mains supply voltage $V_{mns}$ on one terminal per pair A, C, i.e. upper terminal A of the pair on the left of FIG. 1, and upper terminal B of the pair on the right in FIG. 1. The other respective terminal B, D of each respective pair must be connected to a terminal of a starter S. This situation is illustrated in FIG. 1h. Nevertheless, the LED tube LT in accordance with the invention should also work in the situation where there is no starter S. This situation is illustrated in FIG. 1c. It should be noted that for the lifetime of the LED tube system of the invention it may be better to remove the starter S as it may cause high voltage/current spikes which may damage components of the system. Nevertheless, there is no need to remove the ballast/choke CHK. To increase the compatibility even further the LED tube system of the invention should also work in lighting fixtures where the ballast/choke CHK has been removed, wherein the AC mains voltage $V_{mns}$ is supplied to any pair of terminals selected from the four terminals A, B, C, D. In FIG. 1a the AC mains voltage $V_{mns}$ is applied to the terminals A, B on the left side. In FIG. 1b the AC mains voltage $V_{mns}$ is applied to the terminals A, D on the upper-left corner and lower-right corner. In FIG. 1d the AC mains voltage $V_{mns}$ is applied to the terminals C, D on the right side. In FIG. 1e the AC mains voltage $V_{mns}$ is applied to the terminals B, C on the lower-left corner and upper-right corner. In FIG. 1f the AC mains voltage $V_{mns}$ is applied to the terminals A, C on the upper-left corner and upper-right corner. In FIG. 1g the AC mains voltage $V_{mns}$ is applied to the terminals B, D on the lower-left corner and lower-right corner. A normal specification of a fluorescent tube is that it must be compatible with a mains voltage $V_{mns}$ in the range 100-240V (50-60 Hz). It should be noted that there are more connection schemes than illustrated in FIG. 1. For example, in case of a lighting fixture with ballast the mains voltage can be applied between terminal A on the upper-left corner and terminal D on the lower-right corner or terminal B on the lower-left corner and terminal C on the lower-right corner. An advantageous effect of the above described compatibility is that the LED tube system will generate light no matter how it is mounted in the lighting fixture or in what type of lighting fixture it is mounted.

Figure 2:
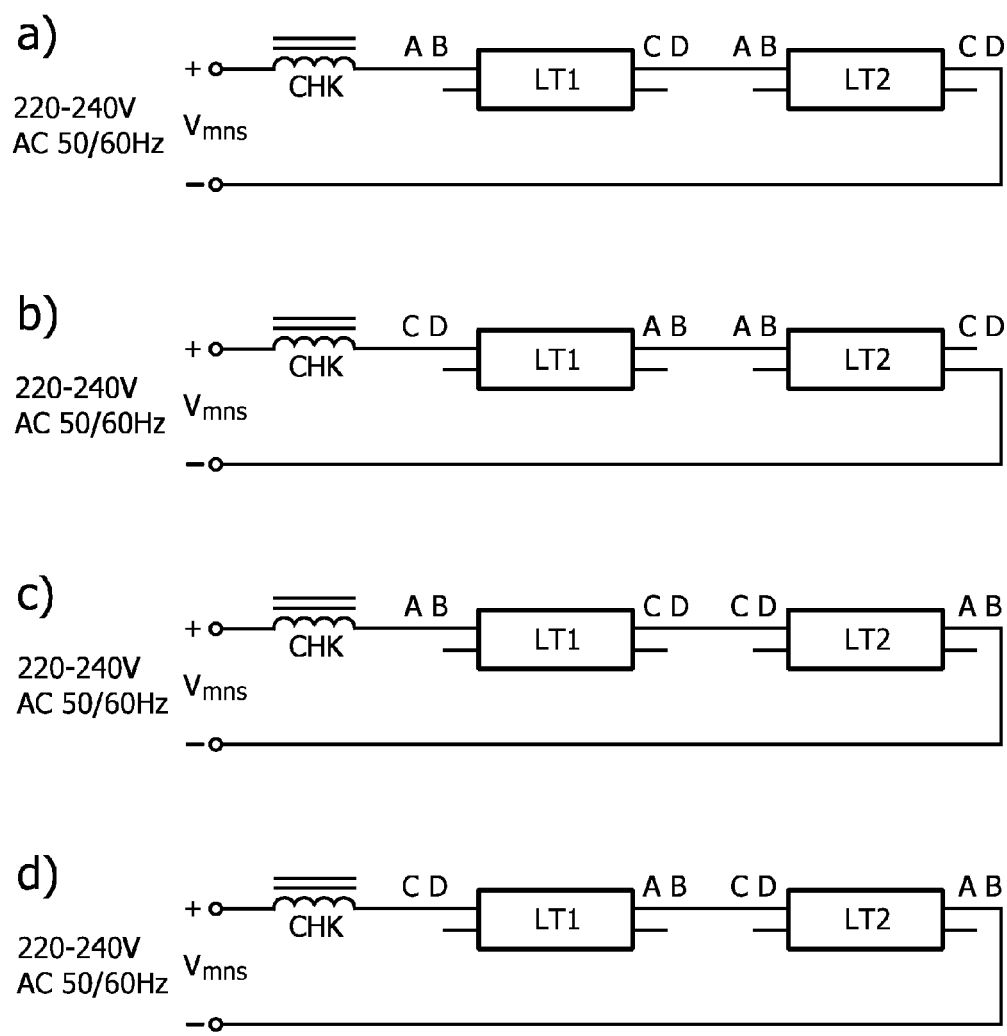
FIG. 2 shows different mains connection schemes of a system with two tubes connected in series.

FIG. 2 shows different mains connection schemes of a system with two tubes connected in series. The LED tube system in accordance with the invention is also compatible with the arrangements illustrated in FIG. 2. FIG. 2a illustrates an arrangement in which both the LED tube LT1 on the left as well as the LED tube LT2 on the right are arranged with the first pair of terminals A, B on the left side and the second pair of terminals C, D on the right side. In FIG. 2b the LED tube LT1 on the left is flipped horizontally with respect to FIG. 2a. In FIG. 2c the LED tube LT2 on the right is flipped horizontally with respect to FIG. 2a. In FIG. 2d both tubes LT1, LT2 are flipped horizontally with respect to FIG. 2a. In all four arrangements the pins of a pair may be swapped, which is illustrated by the fact that the reference numerals are paired as well.

Figure 3:
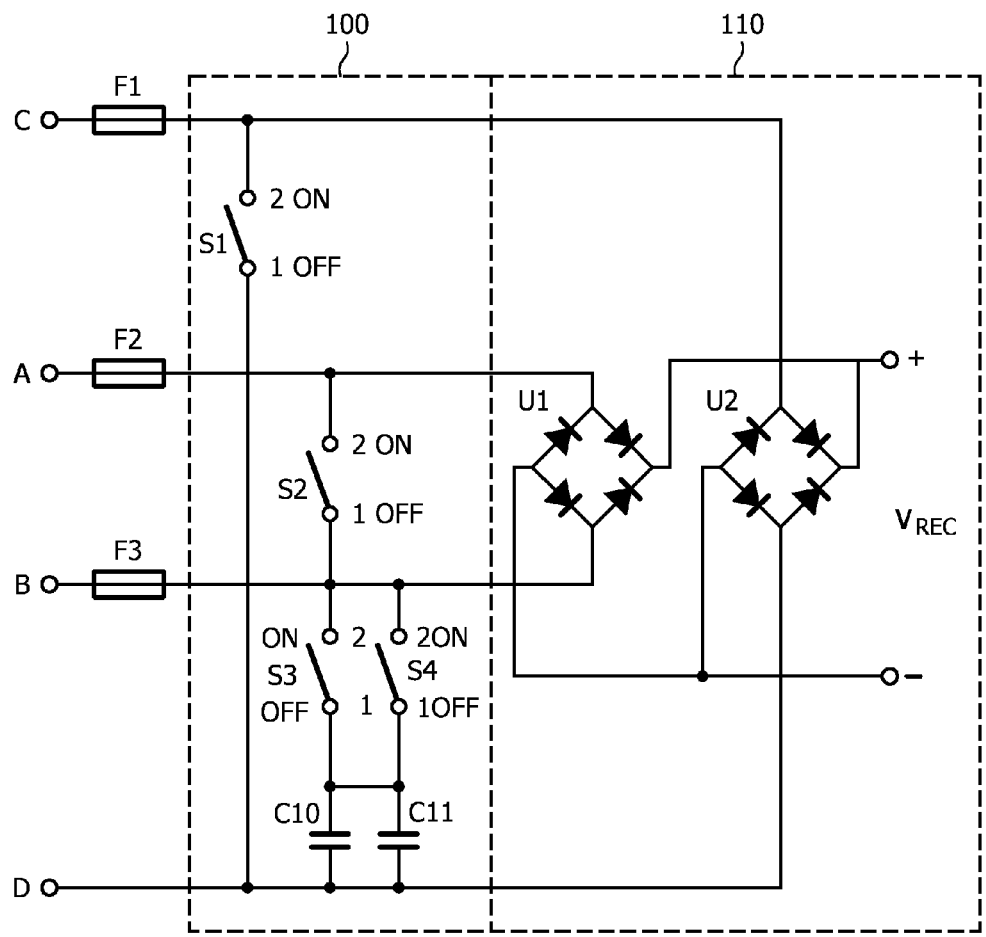
FIG. 3 shows a switching circuit with a rectifier circuit in accordance with an embodiment of the LED tube system of the invention.

FIG. 3 shows a switching circuit with a rectifier circuit in accordance with an embodiment of the LED tube system of the invention. The switching circuit 100 comprises four switches S1, S2, S3, S4 and the two coupling capacitors C10, C11 as illustrated in the figure. The rectifier circuit 110 comprises two diode bridges U1, U2 as illustrated in the figure. Rectifier circuits and diode bridges as such are well-known to the person skilled in the art. For the invention it is not essential that there is a rectifier circuit 110. A rectifier circuit 110 is only required when the LED's that are to be used in the LED tube must be driven by a DC voltage or current. Nevertheless, in particular in case of a metal (aluminum) envelope, as is the case in the embodiment of the LED tube system illustrated in the figures, it is advantageous to implement the LED's in a low-voltage DC part of the circuit which is isolated from the AC mains supply voltage by a transformer. Touching the LED's or the LED tube housing (which may accidentally carry the LED operation voltage in case of a short-circuit between the LED and the LED tube housing 1) is then no longer dangerous for the user.

An important part of the invention resides in the switching circuit 100, because this circuit features the possibility of using the LED tube system in both parallel (FIG. 1) and serial arrangements (FIG. 2).

In the parallel arrangement of the switching circuit 100 all switches S1, S2, S3, S4 are open (set at position 1/"OFF"). When the switches are open the input terminals A, B, C, D are only fed to the diode bridges U1, U2. In that setting the AC mains voltage may be applied to any pair of electrodes selected from the four electrodes A, B, C, D. In all cases the AC mains voltage is effectively rectified into the rectified voltage $V_{rec}$. However, it should be noted that the (free) electrodes that are not connected to the AC mains voltage, may carry dangerously high voltages. This is especially a serious risk for the user when he/she mounts the LED tube system in a lighting fixture (one end of the tube may be already connected to the mains, while the other end is not yet in the lighting fixture). In accordance with the invention an effective safety device can be applied to the LED tube system. Two embodiments of such safety device are discussed later in the description.

In the serial arrangement of the switching circuit 100 all switches S1, S2, S3, S4 are closed (set at position 2/"ON"). When the switches are closed the input terminals of the left pair A, B (FIG. 2) are electrically connected by the second switch S2, and the input terminals of the right pair C, D (FIG. 2) are electrically connection by the first switch S1. The left pair of terminals A, B are further connected to the right pair of terminals C, D through switches S3, S4 and coupling capacitors C10, C11. The inventors have realized that in order to be able to switch two or more LED tube systems in series as illustrated in FIG. 2 the AC-loop has to be closed which is advantageously done through the coupling capacitors C10, C11. Another function of the capacitors is to ensure that in a series connection of multiple LED tubes each tube receives the same operation voltage, because the coupling capacitors C10, C11 ensure that the input impedance of both tubes is matched.

In FIG. 3 two switches S3, S4 are put in parallel. For the function this is not essential. Nevertheless, the advantage of using two switches is a higher reliability. In case one of these switches gets broken the system will continue to work. The switches in FIG. 3 are identical, but they may also be different. Likewise, in FIG. 3 two capacitors C10, C11 are put in parallel. For the function this is not essential. Electrically speaking this could have been a single capacitor having a value equal to the sum of both coupling capacitors C10, C11. Nevertheless, in an embodiment of the LED tube system capacitors larger than a certain specific value did not fit within the envelope of the LED tube system (there was not enough space for these capacitors which are too large). These requirements are not essential for the invention, but still important constraints in the retrofit market. The total capacitance value of the coupling capacitors C10, C11 must be matched with the AC power which runs through them. More information about the coupling capacitors is given later in this description. In a series arrangement of two LED tube systems the mains voltage is applied to one of the terminals on the left side (for example A or B) of the first LED tube LT1 and one of the terminals on the right side (for example C or D) of the second LED tube LT2. It should be noted that in this arrangement the ballast/choke CHK does not need to be removed either. At three of the four terminals there is a fuse F1, F2, F3 which is for safety reasons only (these fuses are optional and are not required for the operation of the switching circuit). In case a current becomes too large (due to a short-circuit or a wrong external connection) the respective fuse breaks down and disconnects the LED tube from the AC mains voltage which reduces the fire risk. It should be noted that when the fuses F1, F2, F3 have not been blown up the internal nodes right after the fuses are electrically speaking the same node, i.e. having the same potential, as the four mains input terminals A, B, C, D. Therefore, for the sake of simplicity in this description the switching circuit 100 is considered to directly receive the mains input voltage from mains input terminals (A, B, C, D), whereas in physically there are fuses in between the switching circuit 100 and the mains input terminals (A, B, C, D).

Figure 4A:
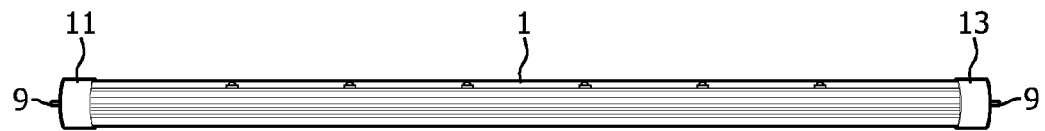
FIG. 4a shows a side view of an embodiment of the LED tube system of the invention.
Figure 4B:
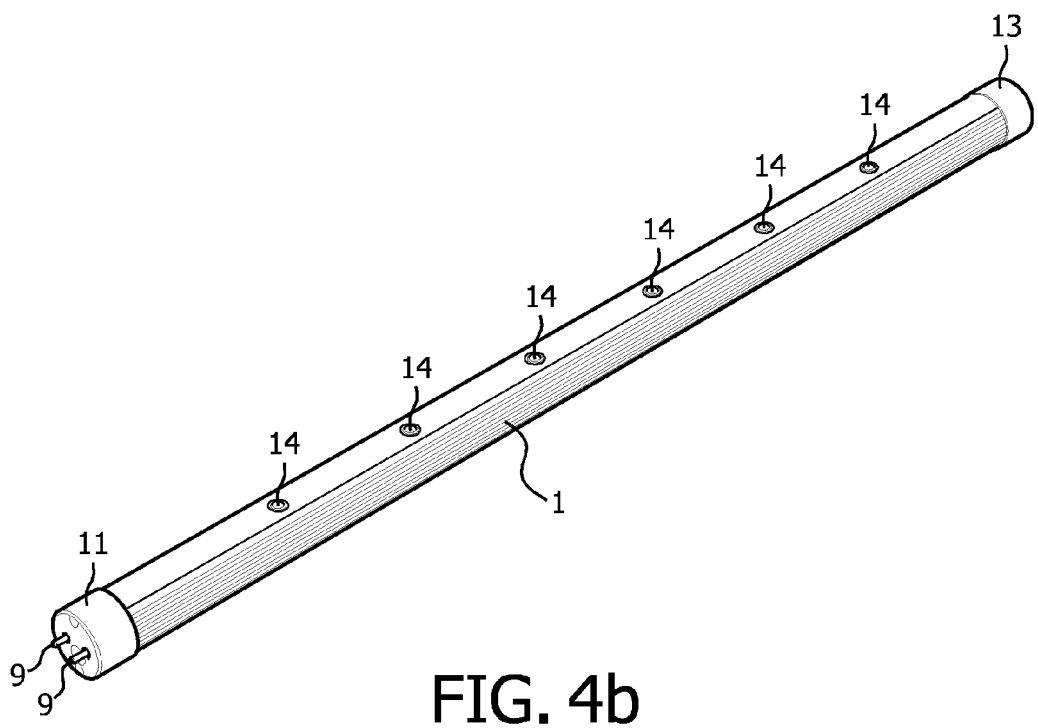
FIG. 4b shows a 3D-view of the embodiment of the LED tube system of the invention.

FIG. 4a shows a side view of an embodiment of the LED tube system of the invention. FIG. 4b shows a 3D-view of the embodiment of the LED tube system of the invention. This embodiment has a length of 60 cm and comprises 6 LED's 14 arranged at a heart-heart distance of 7.6 cm. However, the LED tube system may have any length, and is particularly useful in the range between 20 cm and 240 cm. Nevertheless, in the European retrofit market the lengths are standardized, i.e. 60 cm, 100 cm, 120 cm, and 150 cm. The invention has been applied to all four lengths with success. More information on these embodiments is given later in the description.

The embodiment of FIG. 4 comprises an LED tube housing 1 that is made of aluminum. For the invention it is not essential to use a metal LED tube housing 1, such as aluminum in this example. An advantage of using a metal housing 1 is that it can be effectively used as a heat-sink for the LED's. Nevertheless, choosing a metal LED tube housing 1 implies that a lot of additional technical measures are required in order to obtain a safe product which complies with all safety requirements. The inventors have provided an embodiment of the LED tube system which does comply with all safety requirements. One of the safety measures is the provision of non-conducting end-caps 11, 13 for providing electrical isolation between the metal LED tube housing 1 and mains input pins 9 that are provided on both ends of the tube. More information on safety measures is given later in the description.

Figure 5A:
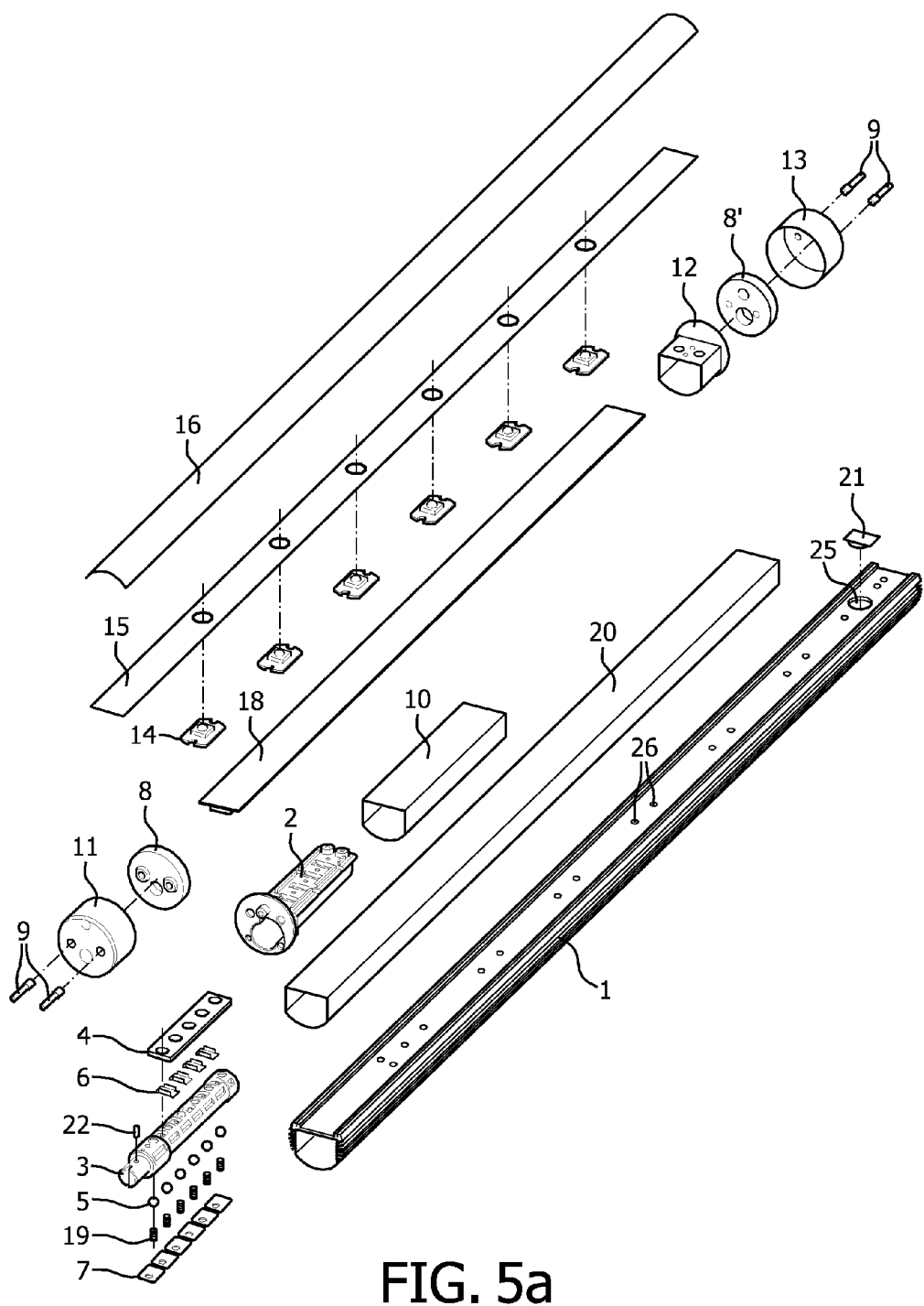
FIG. 5a shows an exploded view with individual parts of the LED tube system of FIG. 4.
Figure 5B:
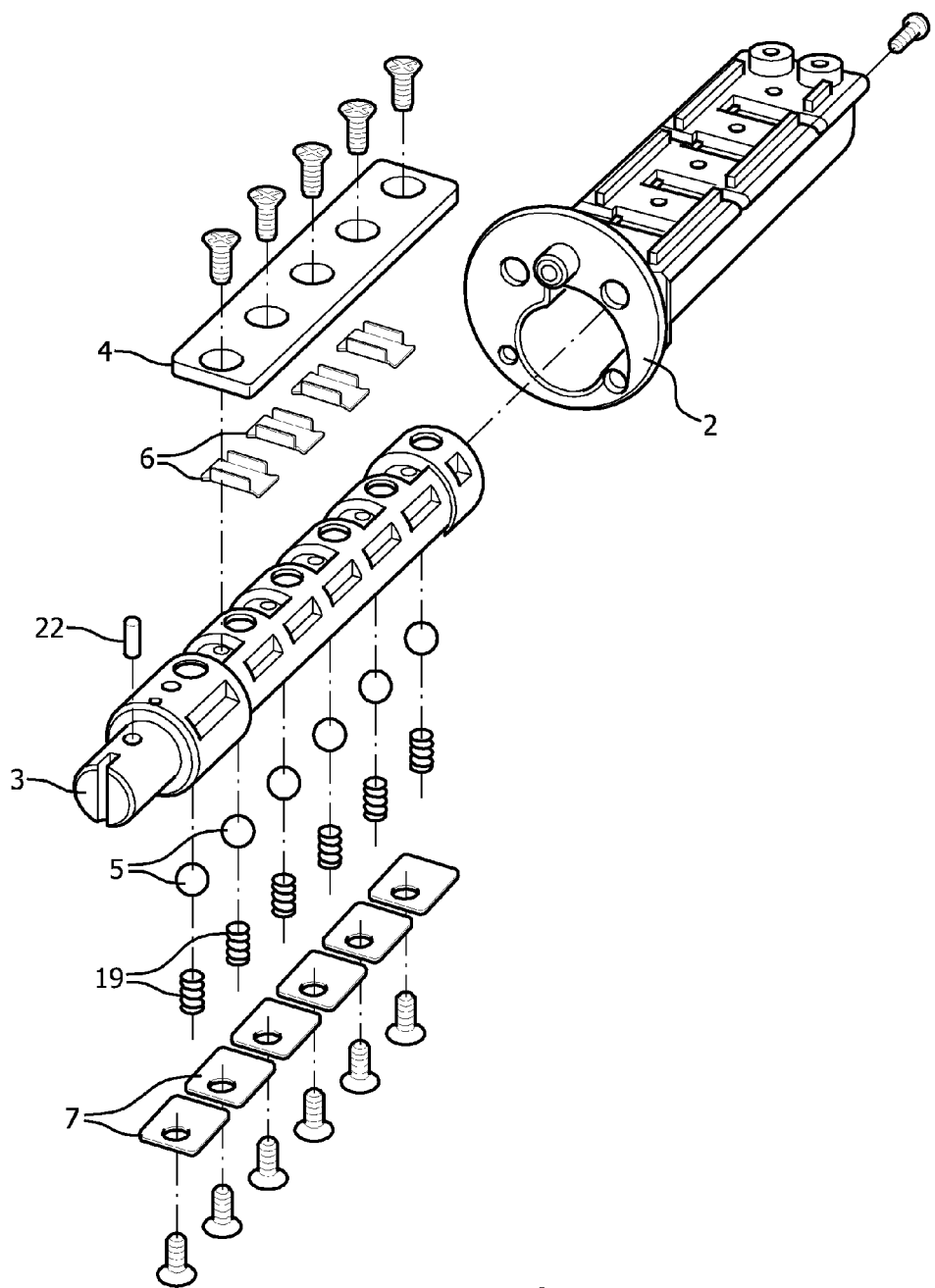

FIG. 5a shows an exploded view with individual parts of the LED tube system of FIG. 4. FIG. 5b shows a zoomed view of a few components in FIG. 5a. The following parts can be identified in the figure. A first main part of the LED tube system is the LED tube housing 1 as already discussed in the previous paragraph. In this example this part comprises aluminum, but this may also be another material such as: brass, bronze, duralumin, copper, gold-plated metals, and silver-plated metals. The length of the housing 1 is 584 mm. A second main part is the plurality of LED assemblies 14, here 6 in total. In this embodiment the LED assemblies each comprise one high-power LED. A third main part of the LED tube system is the PCB 18 comprising the electric circuit (not shown). Embodiments of the electric circuit are discussed in more detail later in the description. The PCB 18 is provided in a PCB housing 20 (for example made of plastic material, but in any case electrically insulating material and thermally resistance) is provided in the LED tube housing 1. The housing 1 comprises an opening 25 at one end through which cables (not shown) run that electrically connect the PCB 18 with the LED's. In the opening 25 a rubber wiring protector 21 (another safety measure) is present to isolate the cables against the housing 1. The housing 1 further comprises screw holes 26 for mounting the LED assemblies 14 thereon. Another main part of the LED tube system is the reflector 15 which is provided on top of the housing 1 such that the LED's stick through corresponding holes thereof. The reflector may comprise material such as poly-ethylene-terephthalate (PET), but other materials are possible also. The housing 1 further comprises two receiving slits on its upper surface through which a transparent front cover 16 can be provided. The transparent front cover 16 may comprises materials such as resin polycarbonate.

A very important main part of the LED tube system is a switching circuit which is provided at one side within the LED tube housing 1. The embodiment of the switching circuit illustrated in the figure comprises a switch housing 10 (for example made of plastic) within which is provided a further switch housing 2 (for example made of plastic, such as resin polycarbonate) as illustrated in the figure. Within this housing 2 there is provided a switch axle 3 (for example made of plastic, such as resin polycarbonate) having six holes therein. The switch axle 3 is rotatable within the further switch housing 2. On the further switch housing 3 there is provided a plurality of switch input connectors 6, i.e. here four input connectors made of copper, and a switch insulating cover 4 with screw holes therein provided on the switch input connectors 6. This cover 4 may comprise electrically insulating materials such as resin polycarbonate. On a backside of the switch axle 3 there is provided six respective switch output connectors 7 (for example made of copper) with six respective springs 19 (for example made of copper) and six respective connector balls 5 (for example made of copper). When the switching circuit is completely mounted, the connector balls 5 are pushed by elastic spring force of the springs 19 in the direction of the switch input connectors 6. In a certain position of the switch axle 3 within the further switch housing 2 the connector balls 5 make electrical contact with the switch input connectors 6. In another position of the axle 3 the connector balls 5 are electrically disconnected from the switch input connectors 6. More information on the operation of the switching circuit is given later in the description. In the switching circuit there is also provided a set pin 22 in the further switch housing 2 which prevents that the switch axle 3 is rotated over more than 90 degrees (the set pin 22 slides within a groove of a certain length around part of a circumference of part of the switch axle 3). It should be noted that the number of switch input connectors 6 and switch output connectors can be different from the example given above.

The LED tube system of FIG. 5a further comprises at an end with the switching circuit a pair of mains input pins 9 (for example made of copper) which extend through an end cap 11 (for example made of resin polycarbonate) and a pin fixer 8 (for example made of resin polycarbonate). On the other end the LED tube system comprises another pair of mains input pins 9 (e.g. copper) which extend through another end cap 13 and a further pin fixer 8'. On the same end an end cap fixer 12 (for example made of resin polycarbonate) is provided. As far as the cooperation with the further pin fixer 8' is concerned, this end cap fixer 12 has a similar function as the further switch housing 2 with the pin fixer 8, which is provided on the other end (with the switching circuit).

Figure 6A:
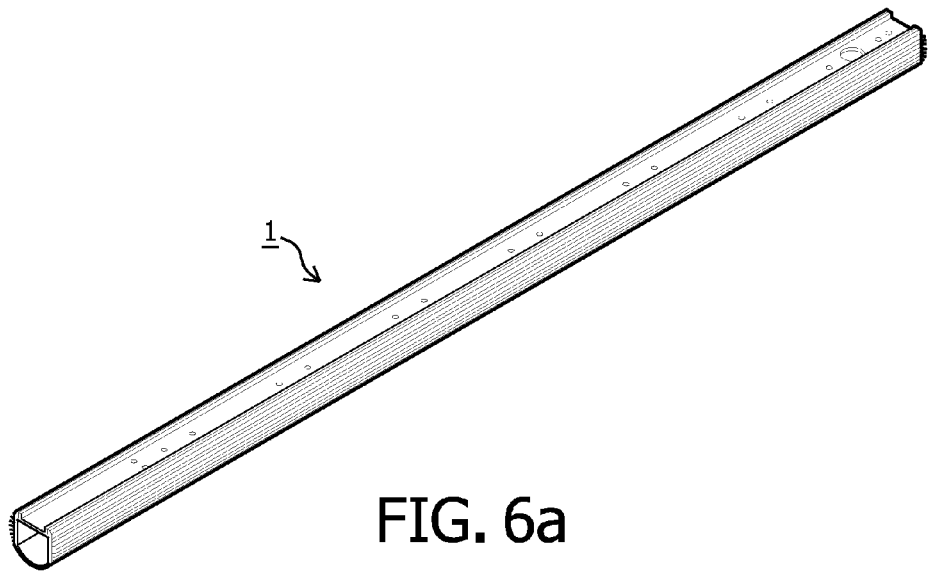
FIG. 6a shows an LED tube housing of the LED tube system of FIG. 4.
Figure 6B:
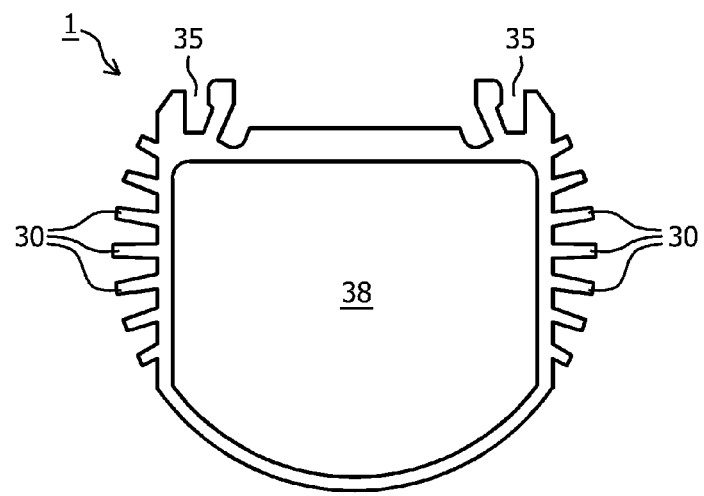

FIG. 6a shows the LED tube housing 1 of the LED tube system of FIG. 4. FIG. 6b shows a cross-sectional view of the LED tube housing 1 of FIG. 6a. The figures further illustrate that the LED tube housing 1 has an inner space 38 for receiving the earlier described PCB 18, PCB housing 20, switching circuit (with all its components), and end cap fixer 12. In order to improve the heat sink function of the LED tube housing 1 cooling fins 30 are provided on sides thereof. Here the designers made weighted surface increase by the fins 30 against increased inner space 38 available for the PCB (with circuitry).

Figure 7A:
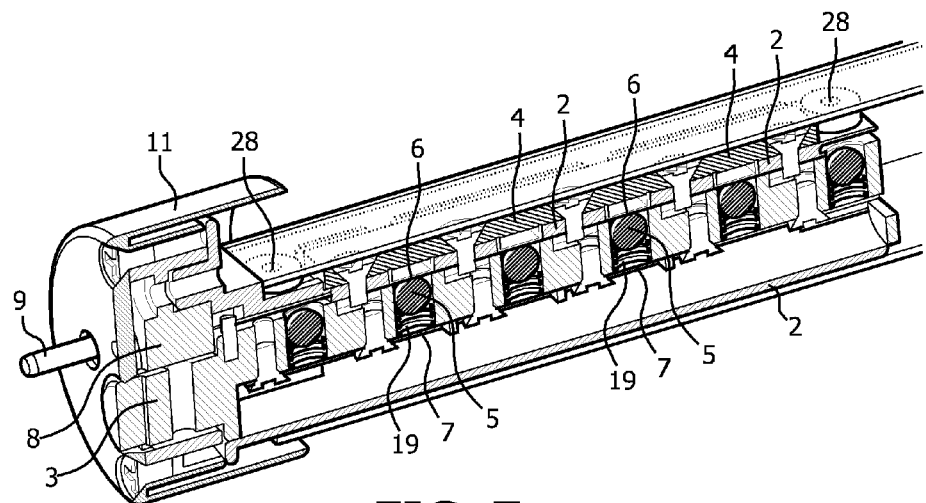
FIG. 7a shows a 3D cut-view of part of the LED tube system of FIG. 4 which illustrates the components of the switching circuit.
Figure 7B:
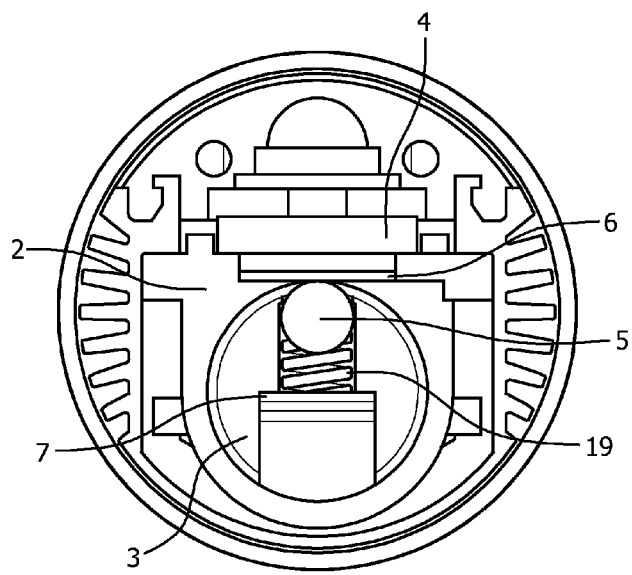
FIG. 7b shows a cut-view through the LED tube system of FIG. 4 at a location of the switching circuit and an LED.
Figure 7C:
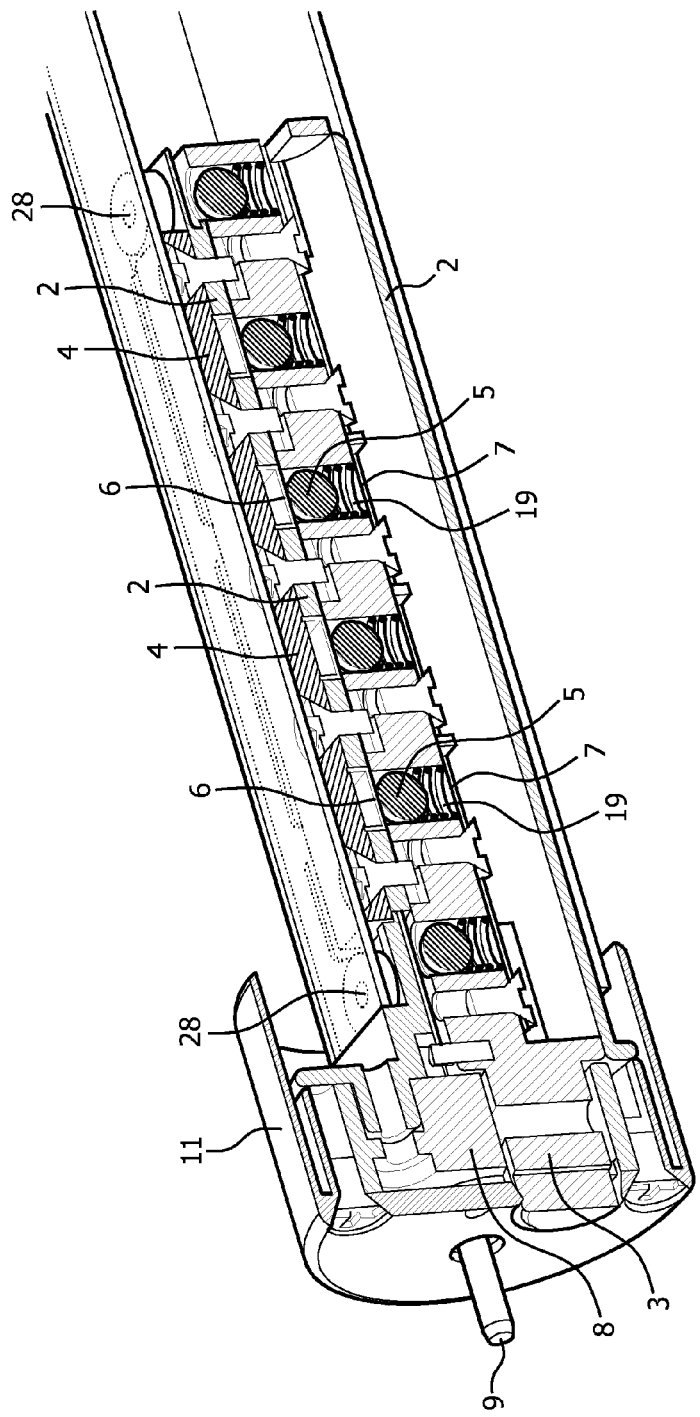

FIG. 7a shows a 3D cut-view of part of the LED tube system of FIG. 4 which illustrates the components of the switching circuit. FIG. 7b shows a cut-view through the LED tube system of FIG. 4 at a location of the switching circuit and an LED. FIG. 7c shows a zoomed view of FIG. 7a. The individual parts of the switching circuit have been discussed in the description of FIG. 5a. In FIG. 7a further screw holes 28 are visible which serve for fixing the switching circuit to the LED tube housing 1 by means of screws. The figures serve to illustrate more clearly the functioning of the switching circuit. It must be stressed that the switching circuit illustrated in the figures is an embodiment which is determined for a large part by the form factor of the switching circuit and safety requirements. Nevertheless, the invention is not restricted to this embodiment only. FIG. 7a illustrates that the inner four of the six switches are used as switch (these switches have an input connector 6) while the outer ones are spare switches (no input connector there). The switching circuit in FIGS. 7a and 7b is a mechanical switch. As already explained within each switch the spring 19 presses the connection ball 5 against the further switch housing 2 or the input connector 6 depending on the orientation of the switch axle 3. On the backside of the spring 19 there is the output connector 7. The connectors 6, 7 the spring 19, and the connector ball 5 are all made of conducting material (copper in this example) and thus, in the orientation of the switch axle 3 in FIG. 7b (switch position 2/"ON") the input connector 6 is electrically connected to the output connector 7. When the switch axle 3 is rotated, for example 90 degrees to the left (switch position 1/"OFF"), the electrical contact between the connector ball 5 and the input connector 6 is broken. It should be noted that for the sake of simplicity all other connections between the respective switches in FIGS. 7a and 7b have been left out. For safety reasons the switch axle 3 is provided with a slot of a screw head on its end between the mains input terminals 9. This means that in operation, while being mounted in a lighting fixture, the switching circuit cannot be switched to another mode.

It should be noted that the switch input connector 6 and the switch output connector can be interchanged without affecting the functioning of the switch. What is important in this embodiment is that at least one of the connectors is provided on the switch axle 3 and the other is provided on the further switch housing 2. Furthermore, in this embodiment the switching circuit is arranged for being provided at one side of the LED tube. In a variation of this embodiment the switching circuit is distributed over two sides. This variation does not depart from the scope of the invention as claimed.

Figure 8A:
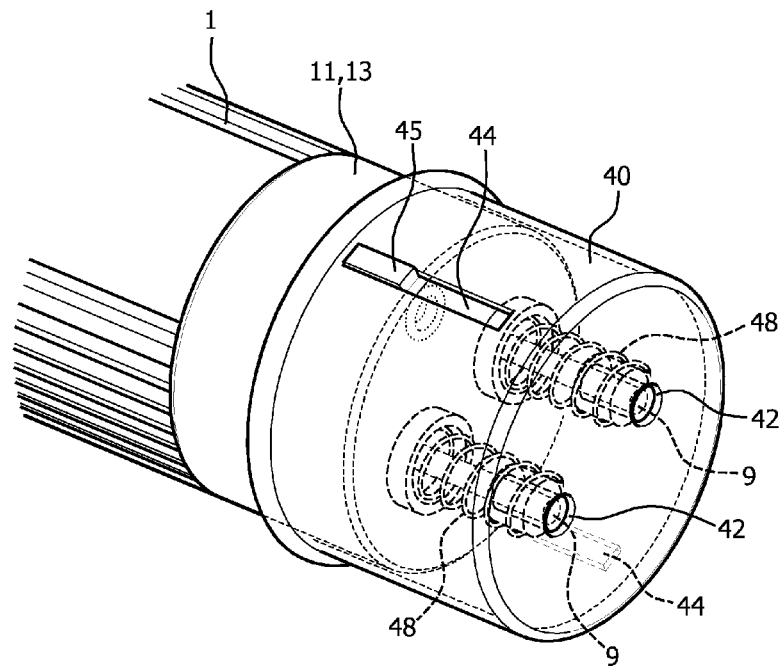
FIG. 8a shows a first embodiment of a safety device in accordance with the invention.
Figure 8B:
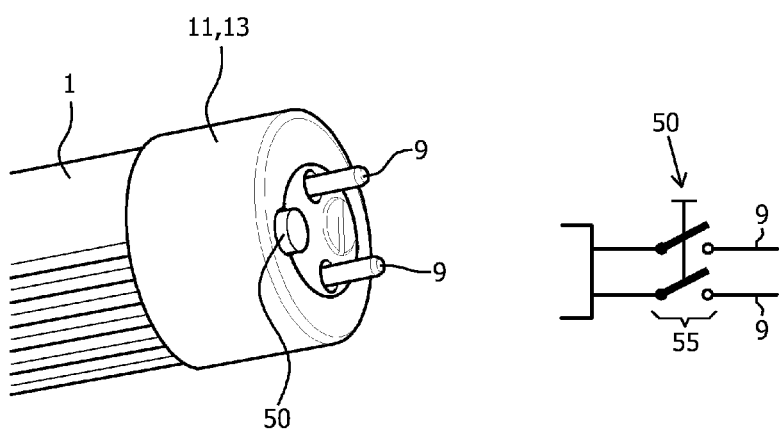
FIG. 8b shows a second embodiment of a safety device in accordance with the invention.
Figure 8C:
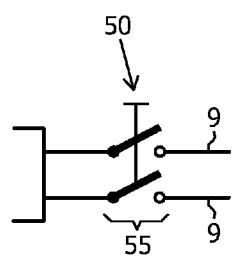
FIG. 8c shows a schematic of part of the safety device of FIG. 8b.

FIG. 8a shows a first embodiment of a safety device in accordance with the invention. FIG. 8b shows a second embodiment of a safety device in accordance with the invention. FIG. 8c shows a schematic of part of the safety device of FIG. 8b. As already earlier described in this description the mounting of the LED tube system in a parallel arrangement (switch position 1/"OFF") may be dangerous as the free mains input terminals (at the side which is not yet put into the lighting fixture) may carry a dangerous voltage (about the mains voltage).

The safety device of FIG. 8a comprises a cover 40 which is provided over the end cap 11, 13. The cover has been drawn as a transparent element. This is not essential but has been done for illustrating the safety device better. The cover 40 comprises two terminal holes 42 corresponding with locations of the mains terminals 9. The cover 40 can be pushed back and forth along the end cap 11, 13, and is spaced apart from the end cap 11, 13 by means of two spacer springs 48 between the end cap 11, 13 and the inner surface of the cover 40. To this end the end cap 11, 13 is provided with two ridges 45 at opposing sides of the end cap. The ridges slide through corresponding guiding slits 44 in the cover 40. The safety device operates as follows. When the LED tube system is put in the lighting fixture the cover 40 is pressed inward which exposes the mains terminals 9. This is done just before the LED tube system is provided in the lighting fixture and thus reduces the risk that a user touches the mains terminals 9 carrying dangerous voltages. Accidental touching of the cover 40 will not expose the mains terminals 9. Serious force must be applied thereto. It should be noted that many variations of the safety device in FIG. 8a are possible and do not depart from the scope of the invention as defined by the claims as long as they rely on the following principle. The covering of the high-voltage carrying mains terminals 9 with a cover 40 that is spaced apart from the end cap 11, 13 before mounting 13 and pushed inward during mounting to release the mains terminals 9.

The embodiment of the safety device illustrated in FIGS. 8b and 8c rely on a different mechanism. In this embodiment the end caps 11, 13 are provided with an interruption button 50 which controls an internal interruption switch as illustrated in FIG. 8c. This embodiment of the safety device operates as follows. Only when the LED tube system is applied in the lighting fixture the interruption button is pressed inward which closes the interruption switch 55 within the end cap 11, 13. This is also called push-to-close. Only then the mains voltage is applied to the external mains terminals 9. It should be noted that many variations of the safety device in FIG. 8a are possible and do not depart from the scope of the invention as defined by the claims. The position of the interruption button 50 depends on the diameter of the tube. Many different tube diameters and many different lighting fixtures are on the market. It is preferred that the interruption button 50 is put at a location directly outside a virtual circle centered with respect to the tube and running through the locations of the mains terminals 9. On this circle the interruption button is preferably put on the perpendicular bisector of the virtual line through the mains terminals 9. It should be noted that many variations of the safety device in FIGS. 8b and 8c are possible and do not depart from the scope of the invention as defined by the claims as long as they rely on the following principle. The provision of a switch in the current path of the mains terminals 9 under control of an interruption button 50 which is activated (push-to-close) upon putting the LED tube system in the lighting fixture.

Figure 9:
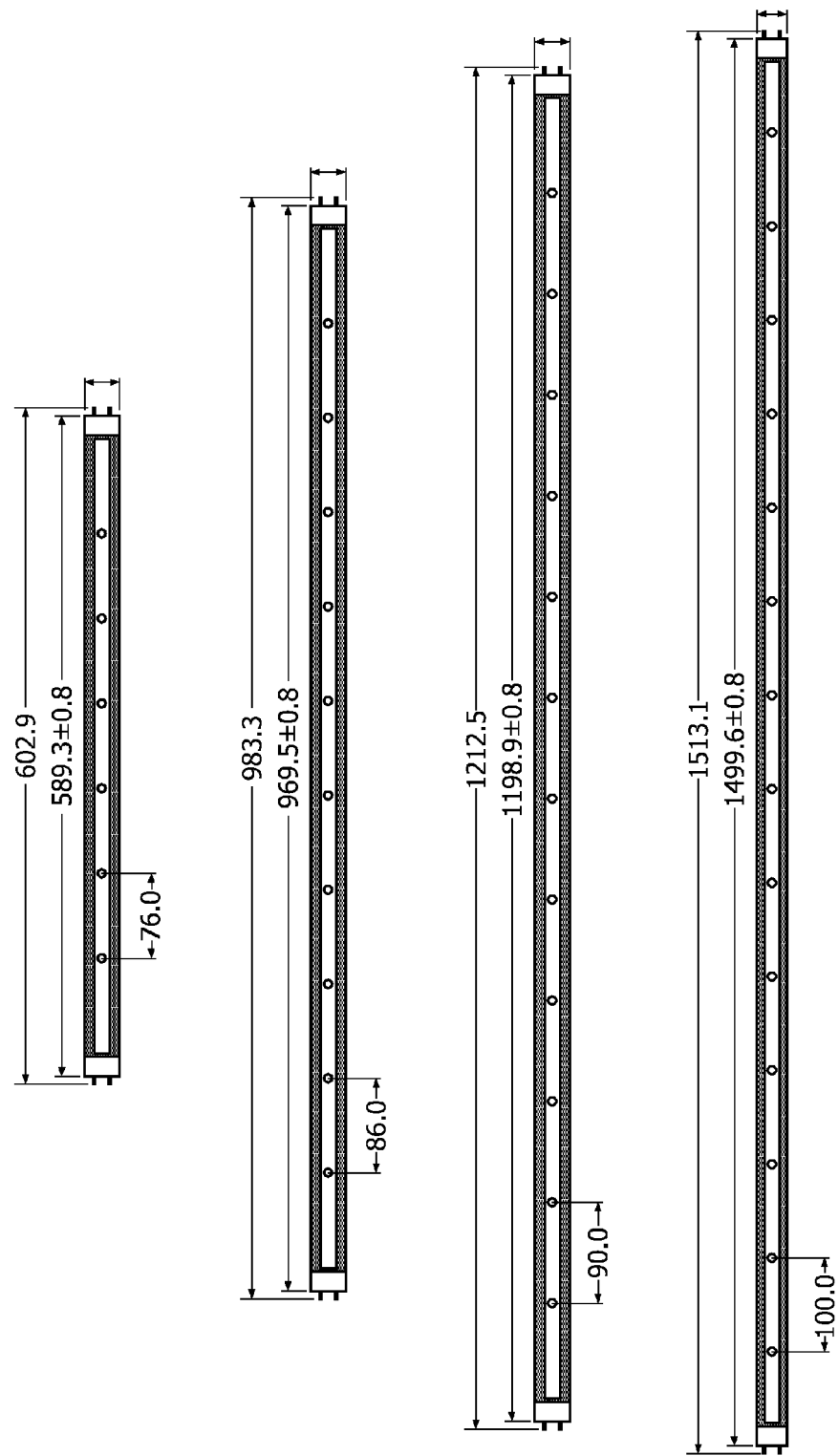
FIG. 9 shows four different embodiments of the LED tube system in accordance with the invention.

FIG. 9 shows four different embodiments of the LED tube system in accordance with the invention. All four embodiments comply with the standard dimensions for fluorescent tubes (thus retrofit).

The first embodiment on the left is an LED tube having a length of 602.9 mm and a diameter of 30.8 mm. This embodiment comprises six high power LED's equal spaced apart (for best light distribution) at a distance of 75.0 mm. A current classification of LED's which is used in the lighting market is as follows:

low power LED's, driving current below 50 mA;
mid power LED's, driving current between 50 mA and 150 mA;
high power LED's, driving current above 350 mA (they can be driven at lower currents, but then their efficiency is generally lower).

The power consumption of the first embodiment is 10.5 Watt and the power factor lies in the range 0.83-0.92. The second embodiment from the left is an LED tube having a length of 983.3 mm and a diameter of 30.8 mm. This embodiment comprises ten high power LED's equal spaced apart (for best light distribution) at a distance of 85.0 mm. The power consumption is 17 Watt and the power factor lies in the range 0.84-0.91. The third embodiment from the left is an LED tube having a length of 1212.5 mm and a diameter of 30.8 mm. This embodiment comprises twelve high power LED's equal spaced apart (for best light distribution) at a distance of 90.0 mm. The power consumption is 20.5 Watt and the power factor lies in the range 0.83-0.90. The fourth embodiment is an LED tube having a length of 602.9 mm and a diameter of 30.8 mm. The fourth embodiment on the right comprises fourteen high power LED's equal spaced apart (for best light distribution) at a distance of 100.0 mm. The power consumption is 24 Watt and the power factor lies in the range 0.83-0.90. All embodiments operate with a mains supply voltage in the range of 100-240 VAC, 50/60 Hz.

Figure 10:
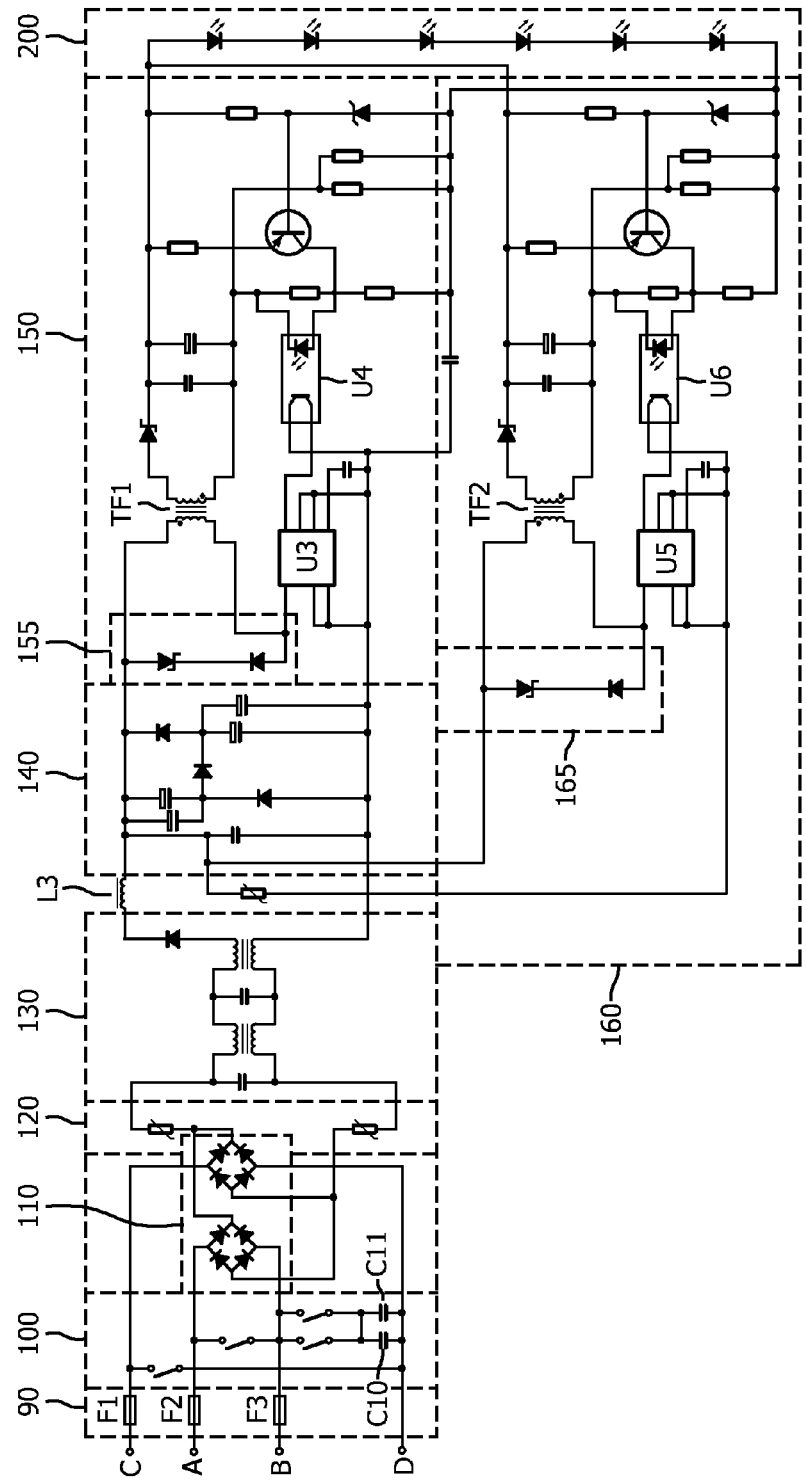
FIG. 10 shows an equivalent circuit diagram of the LED system in accordance with the first embodiment in FIG. 9.

FIG. 10 shows an equivalent circuit diagram of the LED system in accordance with the first embodiment in FIG. 9. The LED tube system comprises the earlier described switching circuit 100 and the rectifier circuit 110. A fuse circuit 90 with fuses F1, F2, F3 (already discussed) is present between the terminals A, B, C, D and the switching circuit 100. Right after the rectifier circuit 120 there is a spike-current-reduction circuit 120 which uses NTC's. The spike-current-reduction circuit 120 is followed by a filter 130. The filter is connected (through an EMI-reducing coil L3) to a power-factor correction circuit 140 which is connected to a first driver circuit 150 which drives the series connection of the LED's 200 (six LED's). The first driver circuit 150 comprises a transformer TF1 for converting the high voltage to a (safe) low voltage. The first driver circuit 150 also comprises a feedback loop which uses an opto-isolator U4 and a controller IC U3 (here a TNY267). The controller IC controls the current through the transformer TF1. A second driver circuit 160 is provided which also receives its input current from the filter 130 (through the EMI-reducing coil L3). The second driver circuit 160 is similar to the first and serves to boost the current through the LED's 200. As the form factor has been the limiting factor it was difficult to fit in stronger driver circuits. Instead, two smaller driver circuits, each providing 155 mA, is provided which brings the LED driver current to 310 mA. Both driver circuits 150, 160 have a peak-voltage absorption circuit 155, 165 connected to the inputs of the respective transformers TF1, TF2. It must be stressed that the individual circuits of the LED tube system as such are well-known to the person skilled in the art. The equivalent circuit diagrams of FIGS. 10 to 13 only serve to illustrate possible embodiments of the LED tube system. Many variations on the LED tube systems presented here are possible. Certain circuits are not necessary for the operation but are there to make the system comply with the safety requirements and other product requirements. What is important however is that the LED tube system features electrical separation of the high-voltage mains side and the low-voltage LED side by means of the transformers. This is particularly advantageous, i.e. safer, in case the high-power LED's are in a metal housing 1. The coupling capacitors C10, C11 in the switching circuit 110 are 2.2 µf and 0.33 µf respectively, which brings the total capacitance value to 2.53 µf. This value complies with the AC power of 8.5 Watt in this embodiment.

Figure 11:
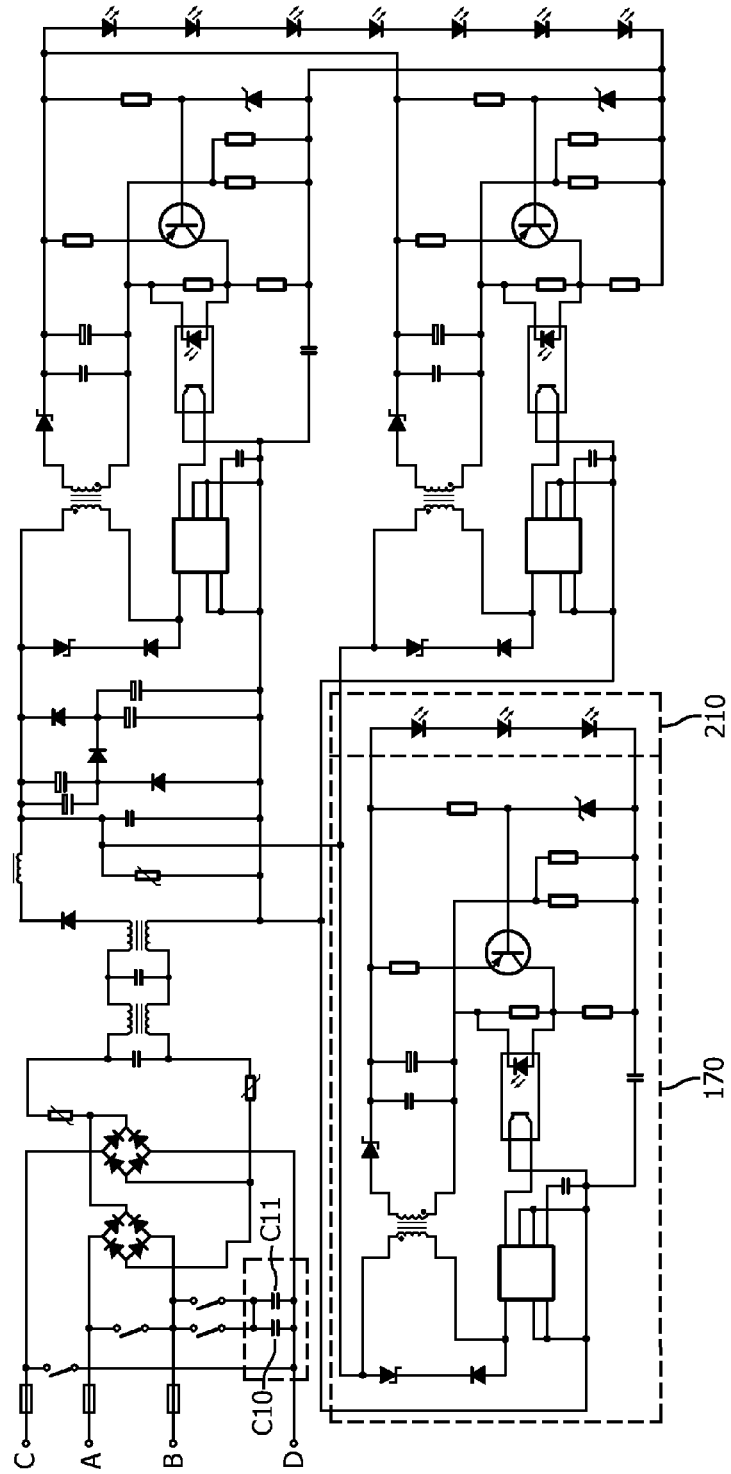
FIG. 11 shows an equivalent circuit diagram of the LED system in accordance with the second embodiment in FIG. 9.

FIG. 11 shows an equivalent circuit diagram of the LED system in accordance with the second embodiment in FIG. 9. The major difference with FIG. 10 is that this LED tube system comprises a third driver circuit 170 which drives a second series connection of LED's 210. In this embodiment the first series connection 200 comprises seven LED's and the second series connection 210 comprises three LED's. Another difference is that the coupling capacitors C10, C11 in the switching circuit 110 are both 2.2 µf, which brings the total capacitance value to 4.4 µf. This value complies with the AC power of 14.5 Watt in this embodiment.

Figure 12:
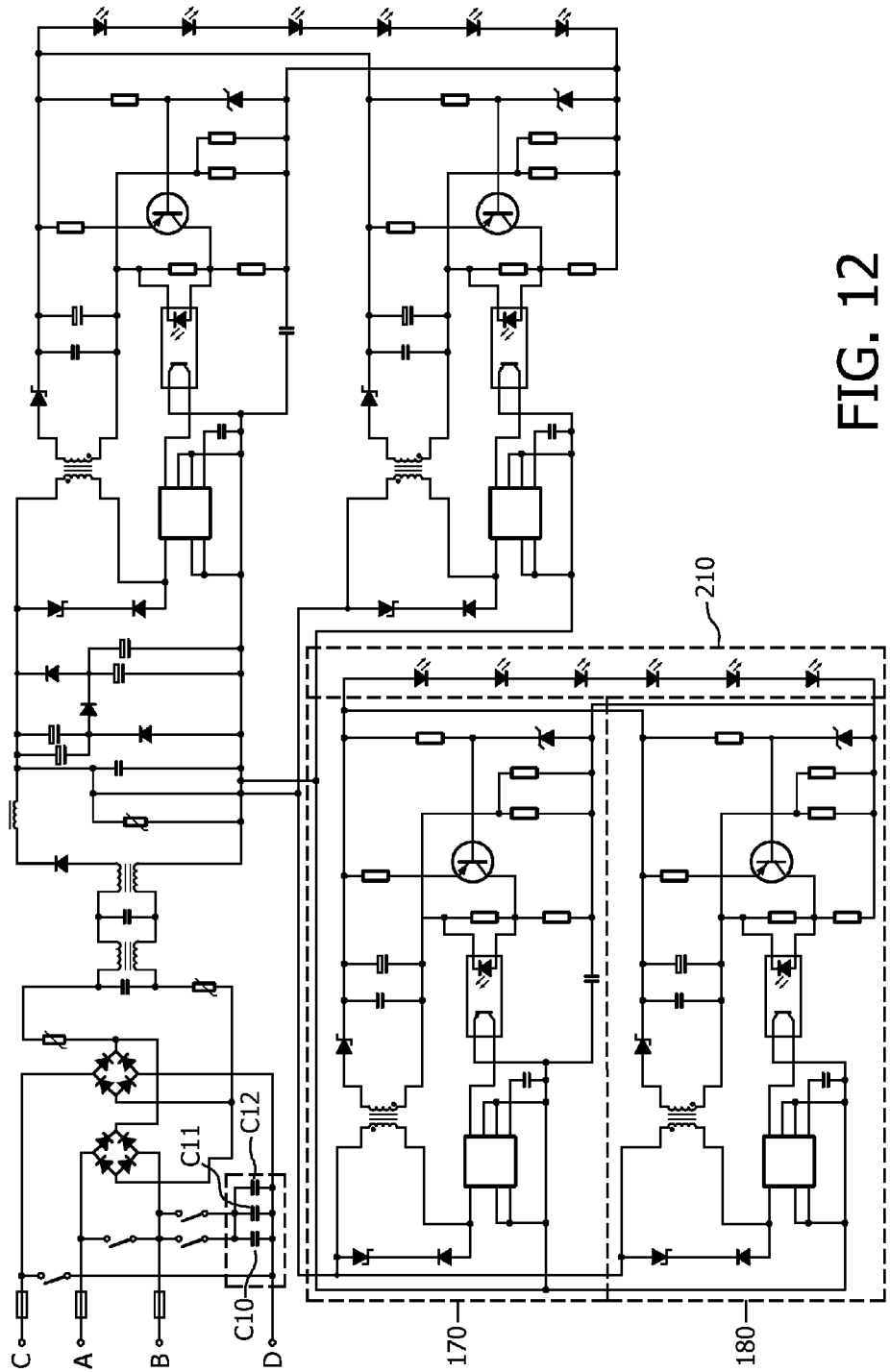
FIG. 12 shows an equivalent circuit diagram of the LED system in accordance with the third embodiment in FIG. 9.

FIG. 12 shows an equivalent circuit diagram of the LED system in accordance with the third embodiment in FIG. 9. The major difference with FIG. 10 is that this LED tube system comprises a fourth driver circuit 180 which drives the second series connection of LED's 210. In this embodiment the first series connection 200 comprises six LED's and the second series connection 210 comprises six LED's. Another difference is that the there are now three coupling capacitors C10, C11, C12 in the switching circuit 110 of 2.2 µf, 2.2 µf, and 0.33 µf, respectively, which brings the total capacitance value to 4.73 µf. This value complies with the AC power of 17 Watt in this embodiment.

Figure 13:
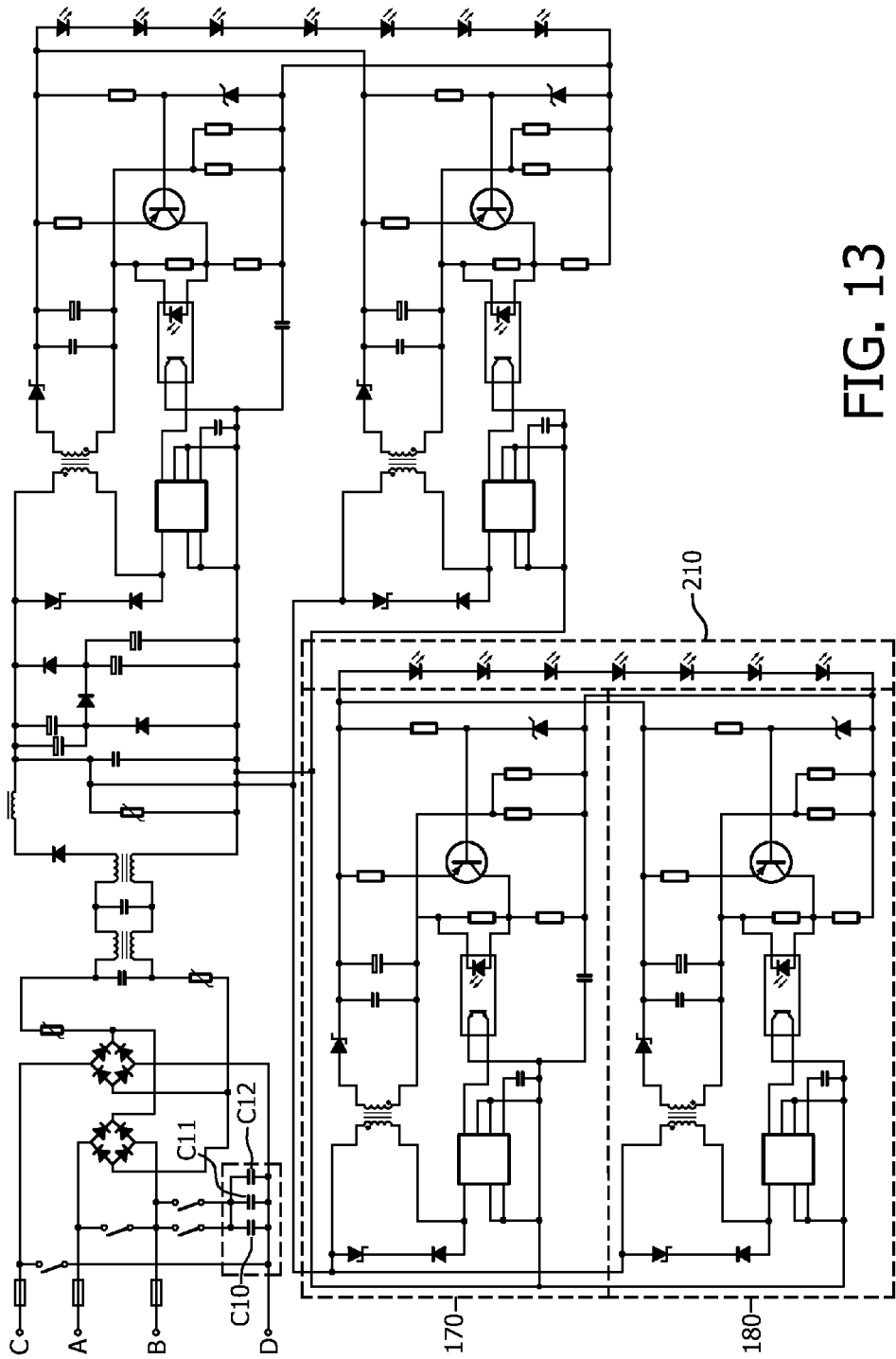
FIG. 13 shows an equivalent circuit diagram of the LED system in accordance with the fourth embodiment in FIG. 9.

FIG. 13 shows an equivalent circuit diagram of the LED system in accordance with the fourth embodiment in FIG. 9. The major difference with FIG. 12 is that the first series connection 200 of LED's and the second series connection 210 of LED's comprise 7 LED's each. Further, the third coupling capacitor is now 1.0 µf, which brings the total capacitance value to 5.4 µf. This value complies with the AC power of 19.5 Watt in this embodiment.

The invention thus provides an LED tube system for driving at least one LED assembly (14, 200) comprising: an LED tube housing (1) for containing the at least one LED assembly (14, 200), two pairs of mains input terminals (A, B) provided at ends of the LED tube housing (1) for receiving a mains supply voltage ($V_{mns}$) and for supplying the mains supply voltage ($V_{mns}$) to an internal part of the LED tube system for driving the at least one LED assembly (14, 200), and further comprising a switching circuit (100) being electrically connected with all mains input terminals (A, B, C, D) and being arranged for electrically connecting the pairs of mains input terminals together in a first state (2/ON) and electrically separating the pairs in a second state (1/OFF) of the switching circuit (100). The switching circuit being further arranged for providing a coupling capacitor (C10, C11) between the first pair and the second pair of input terminals in the first state (2/ON) and removing the coupling capacitor (C10, C11) in the second state (1/OFF) of the switching circuit (100). Due to the switching circuit (100) the LED tube system in accordance with the invention can be used in lighting fixtures for parallel fluorescent tubes as well as in lighting fixtures for serial fluorescent tubes. The invention further provides safety devices for the LED tube system.

The invention may be applied in various application areas. For example, the invention may be applied in retrofit lighting products such as a replacement for fluorescent tubes. However, it must be stressed that the LED tube system accordance with the invention is not restricted to that kind of lamps only.

Various variations of the LED tube system in accordance with the invention are possible and do not depart from the scope of the invention as claimed. These variations for example relate to respective material choices for the components, to respective shapes of the respective components, to the number of LED's in the LED assembly, etc. Any number of LED's starting from one LED is possible. In the embodiments discussed in the description the focus has been on high-power LED's (>100 Lumen/Watt) driven at low-operating voltages (in this example between 3.2V and 12.4 V) and higher currents (several hundred's of mA, in this example between about 300 and about 700 mA)). However, this is not essential. When the efficiency of LED's is further increased (which is very likely to happen) also lower power LED's may be used. When the efficiency is increased even further also non-metal LED tube housings become more feasible. The embodiment illustrated in the figures resembles the conventional fluorescent tube, i.e. it has the same shape. This is done in order to obtain a quick market acceptance of this product. However, it should be noted that the invention is not limited to this kind of lamp shapes. The invention is applicable to any kind of LED tube system having any kind of shape.

Another interesting variation concerns the use of a fully electrical switching circuit for an LED tube system instead of a mechanical switching circuit. This does not depart from the scope of the invention as claimed.

It should be noted that the protection devices discussed in the description are also applicable to LED tube systems which do not have the switching circuit as claimed in the claims.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage. Throughout the Figures, similar or corresponding features are indicated by same reference numerals or labels.

The invention claimed is:

1. LED tube system for driving at least one LED assembly (14, 200), the LED tube system comprising:
   an LED tube housing (1) for containing the at least one LED assembly (14, 200);
   a first pair of mains input terminals (A, B) provided at a first end of the LED tube housing (1) and a second pair of mains input terminals (C, D) provided at a second, opposing, end of the LED tube housing (1) for receiving a mains supply voltage ($V_{mns}$) between a respective one of the first pair of mains input terminals (A, B) and a respective one of the second pair of mains input terminals (C, D) and for supplying the mains supply voltage ($V_{mns}$) to an internal part of the LED tube system for driving the at least one LED assembly (14, 200), and
   a switching circuit (100) being electrically connected with all mains input terminals (A, B, C, D) and being arranged for:
   i) electrically connecting the first pair of mains input terminals (A, B) in a first state (2/ON) of the switching circuit (100) and electrically separating the first pair of mains input terminals (A, B) in a second state (1/OFF) of the switching circuit (100);
   ii) electrically connecting the second pair of mains input terminals (C, D) in the first state (2/ON) of the switching circuit (100) and electrically separating the second pair of mains input terminals (C, D) in the second state (1/OFF) of the switching circuit (100);
   iii) electrically connecting a coupling capacitor (C10, C11) between a respective one of the first pair of mains input terminals (A, B) and a respective one of the second pair of mains input terminals (C, D) in the first state (2/ON) of the switching circuit (100) and electrically separating the respective one of the first pair of mains input terminals (A, B) and the respective one of the second pair of mains input terminals (C, D) in the second state (1/OFF) of the switching circuit (100).

2. The LED tube system as claimed in claim 1, wherein the switching circuit (100) comprises:
   i) a first switching element (S2) between the first respective one of the first pair of mains input terminals (A, B) and the second respective one of the first pair of mains input terminals (A, B);
   ii) a second switching element (S1) between the first respective one of the second pair of mains input terminals (C, D) and the second respective one of the second pair of mains input terminals (C, D), and
   iii) a series connection of a third switching element (S3, S4) and a coupling capacitor (C10, C11) arranged between the respective one of the first pair of mains input terminals (A, B) and the respective one of the second pair of mains input terminals (C, D), wherein the switching elements (S1, S2, S3, S4) are all closed in the first state (2/ON) of the switching circuit (100) and all opened in the second state (1/OFF) of the switching circuit (100).

3. The LED tube system as claimed in claim 2, wherein the switching circuit (100) comprises switch housing (10) with a plurality of mechanical switches provided therein for forming the first switching element (S2), the second switching element (S1), and the third switching element (S3).

4. The LED tube system as claimed in claim 3, wherein the switch housing (10) is located within the LED tube housing (1).

5. The LED tube system as claimed in claim 3, further comprising a further switch housing (2) and a switch axle (3) which is rotatably mounted within the further switch housing (2), wherein the plurality of mechanical switches are implemented in the further switch housing (2) and the switch axle (3) such that the plurality of mechanical switches are switched between the respective states by rotation of the switch axle (3) within the further switch housing which respectively, wherein the rotation opens and closes a conduction path through the further switch housing (2) and the switch axle (3).

6. The LED tube system as claimed in claim 5, wherein each respective one of the plurality of mechanical switches comprises a respective conduction path, wherein each respective conduction path comprises: two respective switch connectors (6, 7), and a respective electrically conductive connector ball (5) with a respective electrically conductive spring (19) between said switch connectors (6, 7), wherein the switch axle (3) comprises respective holes in which there is provided a respective one of the two respective switch connectors (7, 6), the respective connector ball (5) and the respective spring (19) between the respective connector ball (5) and the respective one of the respective two switch connectors (7, 6), wherein another respective one of the two respective switch input connectors (6, 7) is provided adjacent to the switch axle (3) such that in a first orientation of the switch axle (3) corresponding with the first state (2/ON) the respective connector ball (5) is pressed by the respective spring (19) against the another respective one of the two respective switch input connectors (6, 7) and in a second orientation of the switch axle corresponding with the second state (1/OFF) the respective connector ball (5) is pressed against the further switch housing (2).

7. The LED tube system as claimed in claim 1, further comprising a rectifier circuit (110) having a rectifier input for receiving the AC mains voltage from the mains terminals (A, B, C, D), and a rectifier output for supplying a rectified voltage, the rectifier circuit (110) being arranged for rectifying the AC mains voltage to obtain the rectified voltage.

8. The LED tube system as claimed in claim 7, further comprising a driver circuit (150, 160, 170, 180) having a driver input for receiving the rectified voltage from the rectifier circuit (110), and a driver output being connected to the at least one LED assembly (14, 200) for supplying a DC output to the at least one LED assembly (14, 200), the driver circuit (150, 160, 170, 180) being arranged for converting the rectified voltage into the DC output.

9. The LED tube system as claimed in claim 1, further comprising a fuse circuit (90) between the mains input terminals (A, B, C, D) and the switching circuit (100) for maximizing input currents of the mains input terminals (A, B, C, D).

10. The LED tube system as claimed in claim 1, wherein the LED tube housing (1) is tube-shaped.

11. The LED tube system as claimed in claim 1, wherein the LED tube housing (1) has a length between 20 cm and 240 cm.

12. The LED tube system as claimed in claim 1, wherein the LED tube housing (1) comprises materials selected from a group comprising: aluminum, brass, bronze, duralumin, copper, gold-plated metals, and silver-plated metals.

13. The LED tube system as claimed in claim 1, wherein the plurality of LED assemblies (14) thermally coupled to the LED tube housing and being equally spaced apart over a distance between 5 cm and 20 cm.

14. The LED tube system as claimed in claim 1, wherein at a respective end of the LED tube housing (1) the respective pair of mains input terminals (9) is covered with a cover (40), wherein the cover (40) comprises two terminal holes (42) corresponding with locations of the mains terminals (9), wherein the cover (40) can be pushed back and forth along the end of the LED tube housing (1), wherein the LED tube system is further arranged such that, before mounting, the cover (40) is spaced apart from the end the LED tube system by means of springs (48) to prevent direct contact the terminals (9), and such that, during mounting, the cover (40) is pushed inward for releasing the mains terminals (9).

15. The LED tube system as claimed in claim 1, wherein at a respective end of the LED tube housing (1) an interruption switch (55) is provided in a current path from the mains input terminals (9) to the remaining part of the LED tube system, and which is controlled by an interruption button (50), wherein the interruption button (50) is placed such that it is pushed inward when the LED tube system is placed in a lighting fixture for closing the interruption switch (55) for establishing the current path.

* * * * *